United States Patent [19]
Hong et al.

[11] Patent Number: 5,708,040
[45] Date of Patent: Jan. 13, 1998

[54] METHOD FOR PREPARING POROUS MEMBRANES UTILIZING WATER OR ORGANIC VAPOR ADSORPTION

[75] Inventors: Jae Min Hong; Seong Ryong Ha; Hyun Chae Park; Yong Soo Kang; Kyu Hong Ahn, all of Seoul, Rep. of Korea

[73] Assignee: Korea Institute of Science and Technology, Seoul, Rep. of Korea

[21] Appl. No.: 654,731

[22] Filed: May 29, 1996

[30] Foreign Application Priority Data

Oct. 28, 1995 [KR] Rep. of Korea ............... 95-37882

[51] Int. Cl.$^6$ ............... C08J 9/28; B01D 39/14; B29C 65/00
[52] U.S. Cl. ............ 521/64; 210/500.29; 210/500.35; 210/500.38; 210/500.39; 210/500.4; 210/500.41; 210/500.42; 210/500.43; 264/41; 264/50; 264/83; 264/212; 264/310; 521/88; 521/89; 521/142; 521/145; 521/146; 521/147; 521/149; 521/180; 521/189
[58] Field of Search ............... 521/64, 88, 89, 521/142, 145, 146, 147, 149, 180, 189; 210/500.29, 500.35, 500.38, 500.39, 500.4, 500.41, 500.42, 500.43; 264/41, 50, 83, 212, 310

[56] References Cited

U.S. PATENT DOCUMENTS 3,133,132  5/1964  Loeb et al. .
4,046,843  9/1977  Sano et al. ............... 210/500.41
4,794,002  12/1988  Henis et al. ............... 424/488
4,894,159  1/1990  Guiver et al. ............... 210/500.4

OTHER PUBLICATIONS

Journal of Membrane Science, vol. 65, pp. 231–246, 1992, Philip Radovanovic, et al., "Formation Of Asymmetric Polysulfone Membranes By Immersion Precipitation. Part II. The Effects Of Casting Solution And Gelation Bath Compositions On Membrane Structure And Skin Formation".

Journal of Membrane Science, vol. 22, pp. 199–215, 1985, p. Aptel, et al., "Polysulfone Hollow Fibers–Effect Of Spinning Conditions On Ultrafiltration Properties".

*Primary Examiner*—John M. Cooney, Jr.
*Attorney, Agent, or Firm*—Oblon, Spivak, McClelland, Maier & Neustadt, P.C.

[57] ABSTRACT

The present invention describes a method for preparing an asymmetric porous membrane by a dry-wet phase inversion method, which comprises contacting a cast or spun polymer solution with water or organic vapor prior to immersing into the non-solvent precipitation medium, whereby said water or organic vapor is adsorbed onto the cast or spun polymer solution. Higher permeability and excellent rejection ability can be obtained, due to the high porosity and uniform pore size of said membranes according to the present invention.

7 Claims, No Drawings ns on their surface. Thus, there has been a continuing need for a porous membrane which has a higher permeability due to a high porosity and a uniform pore size, and which also has a good fractionation ability according to the molecular size as well.

METHOD FOR PREPARING POROUS MEMBRANES UTILIZING WATER OR ORGANIC VAPOR ADSORPTION

BACKGROUND OF THE INVENTION

1. Field of the Invention

The present invention relates to a method for preparing a porous membrane by phase-separating a polymer solution in a non-solvent medium after contact with a gas containing water or organic vapor. More particularly, the invention relates to a method for preparing an asymmetric porous membrane which comprises contacting a cast or spun polymer solution with water or organic vapor prior to immersing into non-solvent precipitation medium, whereby the water or organic vapor is adsorbed onto the polymer solution.

2. Description of the Prior Art

Asymmetric membranes are used in various separation processes including ultrafiltration and microfiltration, as well as in gas separation and pervaporation as a support for a composite membrane. Separation processes such as ultrafiltration and microfiltration are all based on the mechanism that a porous membrane will allow only the passage of materials which are smaller than the pore size, while excluding the larger ones. Ultrafiltration or micro filtration membranes can have a symmetric or asymmetric structure. Ultrafiltration membranes are generally defined as having pores in the range of 0.001 to 0.1 μm on their surface layer, while microfiltration membranes are defined as having pores in the range of 0.02 to 10 μm on their surface layer. Among many different methods for preparing a porous membrane, non-solvent induced phase inversion methods are almost exclusively used for the preparation of asymmetric membranes which are commercially most available. A non-solvent phase inversion method involves the steps of dissolving a membrane forming polymer in a solvent to obtain a flat or a hollow fiber membrane, and immersing the membrane in a non-solvent to obtain a solid separation membrane. Much improvement has been made to these methods since U.S. Pat. No. 3,133,132 of Loeb et al introduced a method for preparing a reverse-osmosis membrane. Currently all types of the commercial membranes, including ultrafiltration, microfiltration and gas separation membranes, are manufactured by the non-solvent induced phase inversion method.

The selective separation characteristic of a porous separation membrane is defined by the permeability and the size-dependent fractionation ability, i.e., selectivity. The surface porosity and the size and the size distribution of the pores on the surface of the membrane are critical to the permeability and selectivity of a membrane. However, they may also be affected by the overall porosity of the membrane. Most preferably, porous membranes have higher porosity and uniform pores in size on their surface. Permeability increases as the surface porosity increases, while selectivity is determined by the size and the size distribution of the pores on the surface of a membrane. As the size of the surface pore decreases, the molecular weight of materials which can pass through the membrane is lowered, while a larger surface pore will allow the passage of even particulate materials of low molecular weight organic materials through the membrane.

Meanwhile, when using the prior non-solvent induced phase inversion methods to produce an asymmetric membrane, the phase separation is often too fast to control the structure of the membrane thus produced. This is true especially in controlling the surface pore size and porosity which can determine the selective permeation characteristics of a separation membrane. Radovanovic, et al. controlled the surface porosity, pore size and size distribution by adjusting the polymer concentration in a polymer solution or adding a small amount of solvent into the non-solvent immersion bath: See P. Radovanovic, S. W. Thiel, and S. T. Hwang, Journal of Membrane Science, vol 65, p231 (1992). The surface porosity, pore size and size distribution could also be controlled by adding additives such as salts or poly(vinyl pyrrolidone) to the polymer solution and effecting phase separation: See P. Atpel, N. Abidine, F. Ivaldi, and J. P. Laffaili, Journal of Membrane Science, vol 22, p199 (1985).

However, those methods failed to provide porous membranes which had an adequately narrow pore size distributio The present inventors have conducted extensive research to solve the problems of the above prior art, and consequently found that nuclei can be uniformly distributed in the membrane by contacting a polymer solution composed of a polymer and a solvent with a gas containing water or organic vapor in a predetermined time so that the water or organic vapor are adsorbed onto the membrane and pores grow from the nuclei.

SUMMARY OF THE INVENTION

The object of the invention is to provide a method for preparing asymmetric porous membranes which have uniform pore size, a higher porosity, i.e., an excellent fractionation ability and high permeability. The asymmetric porous membranes according to the present invention can be obtained by contacting a cast or spun polymer solution with water or organic vapor prior to immersing into the non-solvent precipitation medium, whereby the water or organic vapor is adsorbed to the polymer solution.

DETAILED DESCRIPTION OF THE INVENTION

The present invention provides a method for preparing an asymmetric porous membrane by a dry-wet phase inversion method, which comprises contacting a cast or spun polymer solution with water or organic vapor prior to immersing into the non-solvent precipitation medium, whereby the water or organic vapor is adsorbed into the polymer solution.

When preparing an asymmetric porous membrane, a number of uniform nuclei are formed and uniformly distributed in the cast or spun polymer solution; From the center of the nuclei the polymer-lean phase will develop into pores. When a solution of membrane forming polymer is directly immersed in a non-solvent, the exchange between the solvent and non-solvent is so fast that the formation rate of the membrane by the phase inversion is uncontrollably high. As a result, only an unacceptably wide pore size distribution can be obtained. Thus, to obtain a membrane of uniform pore size distribution, it is required that a large number of nuclei be uniformly distributed in the cast or spun polymer membrane by slowly adsorbing a pore forming agent into the polymer membrane prior to the phase inversion which is carried out in a non-solvent. The pore forming agent, such as an organic vapor which has been adsorbed prior to the phase inversion, can increase the overall porosity of the membrane, and accordingly a high solvent permeable porous membrane.

Examples of polymers which can be preferably used include, although they are not limited thereto, polysulfone, polyethersulfone, polyamide, polyimide, polyetherimide, polyolefin, polycarbonate, polyphenyleneoxide, polyvinylidene fluoride, polyacrylonitrile, cellulose and their derivatives.

Any solvents or co-solvents can be used for preparing a casting or spinning solution which can dissolve the membrane-forming polymer used. Particularly, NMP (N-methylpyrrolidinone), DMAC (N,N-dimethylacetamide), DMF (N,N-dimethylformamide), DMSO (dimethylsulfoxide), THF (tetrahydrofuran), dioxane, methylene chloride, methyl acetate, ethyl acetate, and chloroform can be used alone or in a mixture, although the solvents are not limited thereto.

Organic vapor can be vapor of a non-solvent or a solvent which can sparingly dissolve the membrane forming polymer used. These preferable organic vapors include methanol, ethanol, 1-propanol, 2-propanol, 1-butanol, 2-butanol, t-butanol, and so on, although they are not limited thereto.

Adsorption of water or organic vapor is accomplished by allowing the cast or spun polymer solution to be in contact with a gas containing a predetermined concentration of water or organic vapor for a predetermined period, prior to entering into a precipitation bath. When an asymmetric porous membrane is prepared using water or organic vapor as described above, the pore size and the porosity can be controlled by adjusting the adsorbed amount of water or organic vapor in the polymer solution while maintaining the other process parameters. The adsorbed amount of water or organic vapor can be controlled by adjusting the period during which the polymer solution is in contact with a gas stream containing water or the organic vapor, or the concentration of water or the organic vapor in the gas stream. The contacting time and the concentration of water or the organic vapor in the gas stream may also be simultaneously controlled.

PREFERRED EMBODIMENT OF THE INVENTION

The present invention will be illustrated in greater detail by way of the following examples. The examples are presented for illustration purposes only and should not be construed as limiting the invention which is properly delineated in the claims.

EXAMPLES 1–3

Polyetherimide was dissolved in NMP at a level of 18% by weight in the resulting polymer solution. Bubbles were removed and the polymer membranes were cast on glass plates. The cast polymer solutions in the form of thin film were contacted with a nitrogen stream containing methanol vapor at a predetermined concentration, respectively, as shown in Table 1 below, at 25° C. for 10 seconds, and then immersed in a precipitation medium of pure water to obtain asymmetric porous membranes. The porous membranes thus obtained were further immersed in a water bath for three days for removing the remaining solvent and the water permeability and fractionation ability for the respective membranes were measured at 40 psig (3.72 atm) using a 0.2% polyethyleneglycol (PEG) solution of molecular weight 18,500 dalton which is dissolved in pure water. The Rejection coefficient is calculated as follows:

$$\text{Rejection coefficient} = 1 - C_p/C_f$$

wherein, $C_p$ and $C_f$ represent a PEG concentration in a stock solution and that in the solution which have passed through the membrane, respectively.

TABLE 1

Water permeability and rejection coefficient of polyetherimide membrane

| Example No. | Vapor pressure of methanol (atm) | Water permeability ($l/m^2 h$) | Rejection coefficient |
|---|---|---|---|
| 1 | 0.012 | 4.8 | 0.95 |
| 2 | 0.016 | 10.2 | 0.86 |
| 3 | 0.020 | 15.7 | 0.86 |

EXAMPLES 4–6

Asymmetric porous membranes were prepared in the same manner as described in Example 1, except that the cast polymer solutions were contacted with a nitrogen gas stream containing ethanol vapor instead of methanol vapor for 15 seconds.

TABLE 2

Water permeability and rejection coefficient of polyetherimide membranes

| Example No. | Vapor pressure of ethanol (atm) | Water permeability ($l/m^2 h$) | Rejection coefficient |
|---|---|---|---|
| 4 | 0.012 | 2.8 | 0.82 |
| 5 | 0.016 | 5.3 | 0.90 |
| 6 | 0.020 | 6.2 | 0.97 |

EXAMPLES 7–9

Asymmetric porous membranes were prepared in the same manner as described in Example 1, except that the cast polymer solutions were brought into contact with a nitrogen gas stream containing propanol vapor, instead of methanol vapor for 20 seconds.

Table 3

Water permeability and rejection coefficient of polyetherimide membranes

| Example No. | Vapor pressure of propanol (atm) | Water permeability ($l/m^2 h$) | Rejection coefficient |
|---|---|---|---|
| 7 | 0.012 | 2.8 | 0.82 |
| 8 | 0.016 | 5.3 | 0.90 |
| 9 | 0.020 | 6.2 | 0.97 |

EXAMPLES 10–11

Asymmetric porous membranes were prepared in the same manner as described in Example 1, except that the cast polymer solutions were brought into contact with a nitrogen gas stream containing water vapor, instead of methanol vapor for 60 seconds.

TABLE 4

Water permeability and rejection coefficient of polyetherimide membranes

| Example No. | Vapor pressure of methanol (atm) | Water permeability (l/m²h) | Rejection coefficient |
|---|---|---|---|
| 10 | 0.013 | 2.9 | 0.88 |
| 11 | 0.020 | 7.2 | 0.68 |

EXAMPLES 12–14

Asymmetric porous membranes were prepared in the same manner as described in Example 1, except that polymer solutions of polysulphone and polyethersulphone were used instead of the polyetherimide solution.

TABLE 5

Water permeability and rejection coefficient of polysulfone and polyethersulfone membranes

| Example No. | Polymer material | Vapor pressure of methanol (atm) | Water permeability (l/m²h) | Rejection coefficient |
|---|---|---|---|---|
| 12 | polysulfone | 0.013 | 4.0 | 0.89 |
| 13 | polyethersulfone | 0.013 | 4.2 | 0.91 |
| 14 | polyethersulfone | 0.020 | 13.2 | 0.63 |

As can be seen from the above results, higher permeability and excellent rejection coefficient can be obtained, which are due to the uniform pore size and high porosity of the membranes which can be achieved by the present invention.

What is claimed is:

1. A method for preparing an asymmetric porous membrane by a dry-wet phase inversion process, comprising bringing a cast or spun polymer solution into contact with a gas containing water vapor or organic vapor prior to immersing the cast or spun polymer solution into a non-solvent precipitation medium, whereby said water vapor or organic vapor is adsorbed onto said polymer solution.

2. The method according to claim 1, wherein said polymer solution is composed of at least one polymer selected from the group consisting of polysulfone, polyethersulfone, polyamide, polyimide, polyetherimide, polyolefin, polycarbonate, polyphenyleneoxide, polyvinylidene fluoride, polyacrylonitrile, cellulose, and their derivatives.

3. The method according to claim 1, wherein said polymer solution contains at least one solvent selected from the group consisting of N-methyl pyrrolidinone, N,N-dimethylacetamide, N,N-dimethylformamide, dimethyl sulfoxide, tetrahydrofuran, dioxane, methylene chloride, methyl acetate, ethyl acetate, and chloroform, and co-solvent thereof.

4. The method according to claim 1, wherein said organic vapor is vapor of a non-solvent or a solvent, or a mixture thereof, which sparingly dissolves the membrane forming polymer.

5. The method according to claim 4, wherein said organic vapor is vapor of at least one selected from the group consisting of methanol, ethanol, 1-propanol, 2-propanol, 1-butanol, 2-butanol, and t-butanol.

6. The method according to claim 1, wherein said gas contains water vapor.

7. The method according to claim 1, wherein said gas contains an organic vapor.

* * * * *